Nov. 2, 1926.
V. VAN BRUNT
1,605,904
ELECTRICAL CONNECTER
Filed Sept. 16, 1925
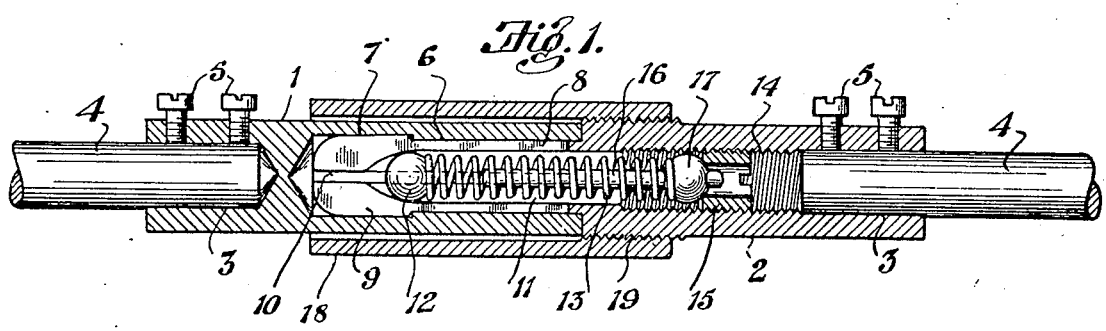
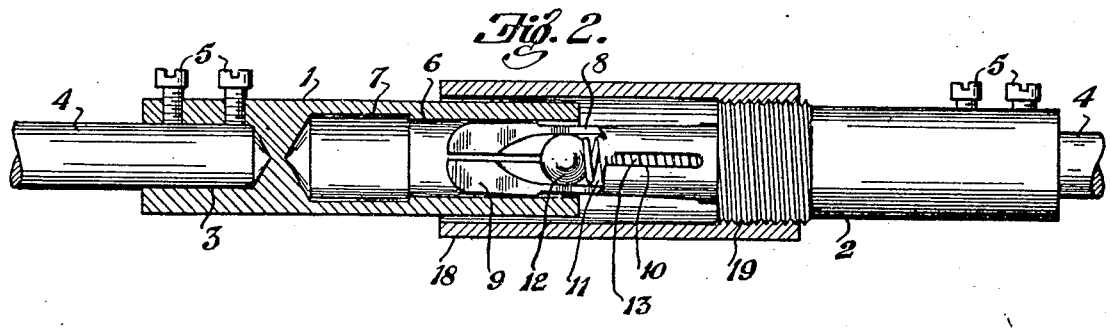
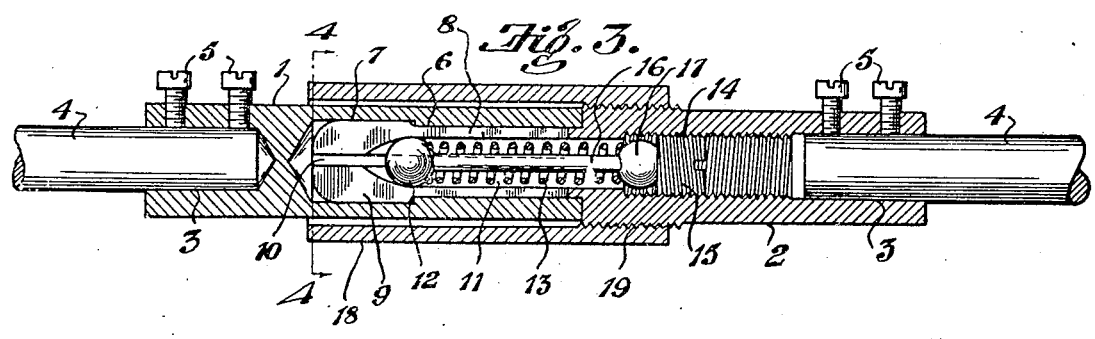
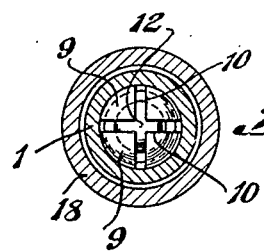
Inventor
Vernon Van Brunt.
By Freas and Bond
Attorneys Patented Nov. 2, 1926.

1,605,904

UNITED STATES PATENT OFFICE.

VERNON VAN BRUNT, OF CANTON, OHIO.

ELECTRICAL CONNECTER.

Application filed September 16, 1925. Serial No. 56,687.

The invention relates to a coupling for connecting together electrical conductors, and the object of the improvement is to provide a coupling which may be adjusted to permit the conductors to be separated when placed under any predetermined strain or pull, means being also provided for so adjusting the coupling that the conductors cannot be separated.

For the purpose of illustration, one form of the invention is shown in the accompanying drawing in which, Figure 1 is a longitudinal sectional view of the connecter showing two wires or cables coupled together thereby, the connecter being adjusted to permit the parts of the same to separate under sufficient strain;

Fig. 2, a similar view showing the connecter in the act of separating;

Fig. 3, a view similar to Fig. 1 showing the connecter adjusted to prevent separation, and Fig. 4, a transverse sectional view taken substantially upon the line 4—4 Fig. 3.

Similar numerals of reference indicate corresponding parts throughout the drawing.

The connecter comprises a pair of coupling members 1 and 2, each of which is provided with a longitudinal opening 3 arranged to receive one end of a conductor wire or cable 4, set screws 5 being provided for holding the end portions of the conductors in said openings.

The coupling member 1 has a tubular socket 6, slightly enlarged at its inner end as at 7, and the coupling member 2 is provided with a reduced shank 8, of spring material, having a slightly enlarged head 9. This shank is split as shown at 10, forming a plurality of spring fingers, each having an enlarged head arranged to be received in the enlarged portion 7 of the socket of the coupling member 1 when the parts are assembled as shown in Fig. 1.

The spring shank 8, of the coupling member 2, is provided with a longitudinal bore 11 extending into the head portion 9, a ball 12 being located within said bore and arranged to be normally held within the head portion of the bore as by the coil spring 13. A portion of the bore 11 may be provided with internal screw threads 14, to receive an adjusting nut 15, by means of which the tension upon the spring 13 may be varied.

For the purpose of holding the ball 12 longitudinally within the head portion of the shank a rod 16 may be located within the coil spring 13 and provided with an enlarged head 17 for engagement with the nut 15.

A protecting sleeve 18 may be connected to the coupling member 2, as by screw threads 19, to surround the spring shank thereof and prevent injury to the shank when the parts of the connecter are uncoupled, this protecting sleeve being especially adapted for use in factories or shops where the parts of the coupling may be frequently disconnected and left in this condition for some time.

In order to couple the ends of the conducters, each conducter will first be connected to one of the coupling members by inserting the same into the socket 3 thereof and tightening the set screws 5. The spring shank of the coupling member 2 may then be inserted into the socket 6 of the coupling member 1, the head portion 9 of the shank being received within the enlarged portion 7 of the socket.

As any desired amount of tension may be placed upon the spring 13, by means of the adjusting nut 15, before the parts are assembled, it will be seen that the coupling may be adjusted to stand any predetermined strain or pull without becoming disconnected.

When the device is used for connecting the conductors of an electric locomotive, an electro-magnet or the like, just sufficient tension may be placed upon the spring 13 to permit the coupling members to separate before sufficient strain is placed upon the conductor to break the same.

In the event a permanent connection is desired the nut 15 may be adjusted to the position shown in Fig. 3, before the cable or wire is inserted into the socket of the coupling member 2. With this adjustment the rod 16 is held rigidly against the ball 12 preventing the head of the shank from being contracted sufficiently to permit withdrawal of the same from the enlarged portion 7 of the socket in the coupling member 1.

In order to separate the parts, as shown in this position, it is first necessary to withdraw the conductor from the socket 3 of the member 2 in order to permit access to the nut 15, which when withdrawn to the position shown in Fig. 1 will permit the ball 12 to be forced against the pressure of the spring 13 sufficiently to allow contraction of the head 9 to withdraw the same from the enlargement 7 of the socket 6.

From the above it will be obvious that a coupling is provided having tension means which may be adjusted to permit the coupling members to separate under any predetermined strain and also having means for permanently locking the coupling members together and preventing separation of the same under any strain.

It is known that coupling members have been made for connecting electrical conductors, which comprise a socket having an enlarged portion to receive the head of a split spring shank but such devices do not provide any means for adjusting the tension upon the spring shank or for permanently holding the same within the socket of the other member.

I claim:

1. An electrical connecter comprising a coupling member provided with a socket having an enlarged inner portion, a co-operating coupling member having a hollow, split, spring shank provided with a head for engagement in said socket, a ball within said shank and spring means for normally holding said ball within said head.

2. An electrical connecter comprising a coupling member provided with a socket having an enlarged inner portion, a co-operating coupling member having a hollow, split, spring shank provided with a head for engagement in said socket, a ball within said shank, spring means for normally holding said ball within said head, and means for adjusting the tension of said spring means.

3. An electrical connecter comprising a coupling member provided with a socket having an enlarged inner portion, a co-operating coupling member having a hollow split spring shank provided with a head for engagement in said socket, a ball within said shank and a coil spring for normally holding said ball within said head.

4. An electrical connecter comprising a coupling member provided with a socket having an enlarged inner portion, a co-operating coupling member having a hollow, split spring shank provided with a head for engagement in said socket, a ball within said shank, a coil spring for normally holding said ball within said head and means for adjusting the tension of said coil spring.

5. An electrical connecter comprising a coupling member provided with a socket having an enlarged inner portion, a co-operating coupling member having a hollow, split, spring shank provided with a head for engagement in said socket, a ball within said shank and means for holding said ball within said head.

6. An electrical connecter comprising a coupling member provided with a socket having an enlarged inner portion, a co-operating coupling member having a hollow, split, spring shank provided with a head for engagement in said socket, a ball within said shank, a rod within the shank arranged to engage the ball and means for adjusting the rod to hold the ball within the head.

In testimony that I claim the above, I have hereunto subscribed my name.

VERNON VAN BRUNT.